(12) United States Patent
Weger et al.

(10) Patent No.: US 7,179,010 B2
(45) Date of Patent: Feb. 20, 2007

(54) ADJUSTABLE PIPE CLAMP ASSEMBLY

(75) Inventors: Kris A. Weger, Plymouth, MI (US);
Marc J. Craig, Brighton, MI (US);
John E. Nemazi, Bloomfield Hills, MI (US)

(73) Assignee: ZSI, Inc., Westland, MI (US)

( * ) Notice: Subject to any disclaimer, the term of this patent is extended or adjusted under 35 U.S.C. 154(b) by 34 days.

(21) Appl. No.: 10/763,436

(22) Filed: Jan. 23, 2004

(65) Prior Publication Data

US 2005/0163561 A1    Jul. 28, 2005

(51) Int. Cl.
*F16B 7/04*    (2006.01)

(52) U.S. Cl. ............... 403/289; 403/290; 403/398; 403/399; 248/72; 248/73; 248/74.1; 248/74.4

(58) Field of Classification Search ........... 403/289, 403/290, 386, 398, 399; 248/67.7, 72, 73, 248/74.1, 74.4
See application file for complete search history.

(56) References Cited

U.S. PATENT DOCUMENTS

| | | | |
|---|---|---|---|
| 3,226,069 A * | 12/1965 | Clarke | 248/73 |
| 3,419,942 A * | 1/1969 | Dunklee | 24/19 |
| 3,486,726 A * | 12/1969 | Kindorf et al. | 248/72 |
| 4,185,802 A | 1/1980 | Myles et al. | |
| 4,251,844 A * | 2/1981 | Horstmann | 361/1 |
| 4,442,994 A | 4/1984 | Logsdon | |
| 4,516,296 A | 5/1985 | Sherman | |
| 4,934,635 A | 6/1990 | Sherman | |
| 5,799,907 A | 9/1998 | Andronica | |
| 5,984,243 A | 11/1999 | Pfaller et al. | |
| 6,152,412 A | 11/2000 | Basickes et al. | |
| 6,164,604 A | 12/2000 | Cirino et al. | |
| 6,446,915 B1 * | 9/2002 | Ismert | 248/68.1 |

FOREIGN PATENT DOCUMENTS

FR    2540577    8/1984

* cited by examiner

*Primary Examiner*—Daniel P. Stodola
*Assistant Examiner*—Michael P. Ferguson
(74) *Attorney, Agent, or Firm*—Brooks Kushman P.C.

(57) ABSTRACT

An adjustable clamp assembly capable of securing various sized cylindrical members is generally formed from a high strength plastic material dispensing the need for a cushion insert for the cylindrical member disposed therebetween. The clamp assembly contains a pair of unitary clamp halves having an inner surface contoured to adequately contact the surface of various sized cylindrical members to provide support when clamping forces are applied. The clamp halves can be interlockingly engageable with one another to enhance the cylindrical member size adjustment capability.

8 Claims, 5 Drawing Sheets

ADJUSTABLE PIPE CLAMP ASSEMBLY

BACKGROUND OF THE INVENTION

1. Field of the Invention

One aspect of this invention relates to an adjustable clamp assembly for securing a cylindrical member to an elongate U-shaped support channel. More particularly, the present invention is directed to a two-piece pipe clamp assembly capable of adjustment to fit multiple pipe sizes.

2. Background Art

Pipes and other elongate cylindrical members often require support systems for successful installation. Common support systems include rails having an elongate support channel, such as Unistrut® metal framing manufactured by UNISTRUT® Corporation. Pipe clamps can be installed to secure a cylindrical member to the support channel. Existing pipe clamp assemblies typically include a pair of clamp halves. Each clamp half is attached to the channel and positioned such that the cylindrical member is interposed therebetween. The pair of clamp halves are connected together by a nut and bolt assembly inserted through flanges in the clamp halves. The clamp halves are urged together upon tightening of the nut and bolt assembly, thereby securing the cylindrical member adjacent the rail.

The clamp halves of existing two-piece pipe clamp assemblies are generally formed from metal, such as steel or aluminum, to provide the requisite strength necessary to support the cylindrical member. As such, these metal clamp halves are susceptible to heat damage, corrosion, temperature fluctuations, and vibration and may be conductive.

Often, clamping forces necessary to secure the metal clamp halves around the cylindrical member to avoid pull-out and slip loads can deform or otherwise damage the cylindrical member. To prevent such damage, pipe clamp assemblies known in the art provide cushion inserts for disposing between the cylindrical member and the clamp halves. Generally, the inserts are made from a deformable elastomeric material, such as foam or rubber, to relieve the cylindrical member from forces applied thereto by direct contact from the clamp halves. Unfortunately, the added cushion inserts increase the number of parts and manufacturing cost. Moreover, the inserts create an additional cumbersome step when installing pipe clamp assemblies to secure pipes to the channel supports.

Another disadvantage of the prior art, two-piece, metal clamp halves is that they lack size adjustment capability to accommodate various pipe sizes. Instead, numerous clamp sizes are necessary to fit various pipe diameters. Manufacturers must accommodate the increasingly numerous clamp sizes, which affects cost. The increased cost is passed along the distribution chain to the end user. Warehousers must increase overall inventory to accommodate each clamp size. Further, the number of parts required on the job site will be greater in order to ensure that the installer has the right size clamp on hand when needed.

SUMMARY OF THE INVENTION

Therefore, one aspect of the present invention is to provide an adjustable clamp assembly for securing a cylindrical member to a support channel that has multi-size adjustment capability allowing a single clamp size to fit and support a plurality of cylindrical member sizes.

Another aspect of the present invention is to provide an adjustable clamp assembly for securing a cylindrical member to a support channel that reduces inventory stock-keeping units (SKU's) and lowers overall inventory costs.

Yet another aspect of the present invention is to provide an adjustable clamp assembly for securing a cylindrical member to a support channel that minimizes the number of different clamps required on the job site.

Yet another aspect of the present invention is to a support channel that employs two interlockingly engageable clamp halves for greater adjustment capability.

Still yet another aspect of the present invention is to provide an adjustable clamp assembly for securing a cylindrical member to a support channel that does not require a cushion insert, thereby limiting the number of assembly components.

Still yet another aspect of the present invention is to provide an adjustable clamp assembly for securing a cylindrical member to a support channel that prevents damage to the cylindrical member in the absence of a cushion insert.

Still yet another aspect of the present invention is to provide an adjustable clamp assembly for securing a cylindrical member to a support channel that is vibration resistant and boosts heat transfer capabilities.

Still yet another aspect of the present invention is to provide an adjustable clamp assembly for securing a cylindrical member to a support channel that is UV and corrosion resistant, as well as non-conductive.

Still yet another aspect of the present invention is to provide an adjustable clamp assembly for securing a cylindrical member to a support channel wherein the required pull-out and slip loads rival that of steel.

And still yet another aspect of the present invention is to provide an adjustable clamp assembly for securing a cylindrical member to a support channel that is temperature adverse such that the clamp assembly can withstand a wide range of temperatures, thereby covering a wide range of applications.

Accordingly, an adjustable clamp assembly for securing cylindrical members of various size to an elongate U-shaped support channel is provided. The clamp assembly includes a plastic unitary first clamp half, a plastic unitary second clamp half, and a fastener. The first and second clamp halves each have a first end, which can be slidably engageable to a support channel, and second end spaced apart from the channel. Moreover, each clamp half contains an inner surface for mating engagement with the cylindrical member during clamping.

In operation, the clamps can be slidably attached to the channel and positioned about cylindrical member such that the inner surfaces face inwardly opposing each other, the cylindrical member therebetween. Each clamp half is slidably mounted along a channel axis to provide flexible and adjustable positioning of the clamp assembly. The fastener cooperates with attachment regions formed in the second ends of each clamp half to couple the clamp halves together. As the fastener is tightened, the clamp halves are urged together, securing the cylindrical member therebetween.

The fastener can be a nut and bolt assembly inserted through apertures located in the attachment regions of each clamp half. The aperture formed in the first clamp half can include a boss for receiving a nut. The boss can be equipped with a detent for snap fitting the nut into the boss, thereby securely retaining it with the first clamp half. The aperture formed in the second clamp half can include a finger for retaining a bolt. The finger requires purposeful force to be applied to the bolt to withdraw it from the aperture.

In one embodiment, the inner surfaces can be furnished with at least one grip bump for providing cylindrical member size adjustment capability. The at least one grip bump are shaped and positioned to provide sufficient clamping contact with a variety of cylindrical member sizes. Moreover, the at lest one grip bump can be designed to make direct contact with the cylindrical member when clamping forces are applied sufficient enough to withstand pull-out and slip loads.

In another embodiment, the inner surfaces of each clamp half can comprise of a primary contact face and a secondary contact face. The primary and secondary contact faces can be generally planar, generally arcuate, or a combination thereof. The primary contact faces are generally defined by primary reference planes, whereas the secondary contact faces are generally defined by secondary reference planes. The primary and secondary reference planes corresponding to the first clamp half form an inwardly facing interior angle. Similarly, the primary and secondary reference planes corresponding to the second clamp half form an inwardly facing interior angle opposing that of the first clamp half. Clamping forces can be applied to a cylindrical member by the primary contact faces, at the very least. However, clamping forces can be applied to a cylindrical member by both the primary contact faces and the secondary contact faces, such as when supporting relatively smaller cylindrical members.

Further, the first and second clamp halves can be interlockingly engageable. The first clamp half is furnished with at least two ribs, while the second clamp half is furnished with at least on rib. The ribs can interleave when the clamp halves are urged together along the channel axis. To enhance the interlocking engagement, the first clamp half ribs can contain alignment grooves matingly engageable with alignment tabs provided on the second clamp half ribs.

The above aspects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 4a is a top view of the adjustable clamp assembly shown in FIG. 3a;

DETAILED DESCRIPTION OF THE PREFERRED EMBODIMENT(S)

As required, detailed embodiments of the present invention are disclosed herein. However, it is to be understood that the disclosed embodiments are merely exemplary of an invention that may be embodied in various and alternative forms. Therefore, specific functional details disclosed herein are not to be interpreted as limiting, but merely as a representative basis for the claims and/or as a representative basis for teaching one skilled in the art to variously employ the present invention.

One aspect of the present invention is directed to an adjustable clamp assembly for securing a cylindrical member to an elongate U-shaped support channel. As described in greater detail below, the adjustable clamp assembly, according to the present invention, supports a broad range of cylindrical members having different outside diameters through direct contact with the cylindrical member while preventing damage caused to the cylindrical member through clamping forces. The ability of the adjustable clamp assembly of the present invention to sufficiently support a cylindrical member through direct contact therewith eliminates the need for an additional cushion insert disposed between the clamp assembly and the cylindrical member for providing a snug fit.

Figure 1A:
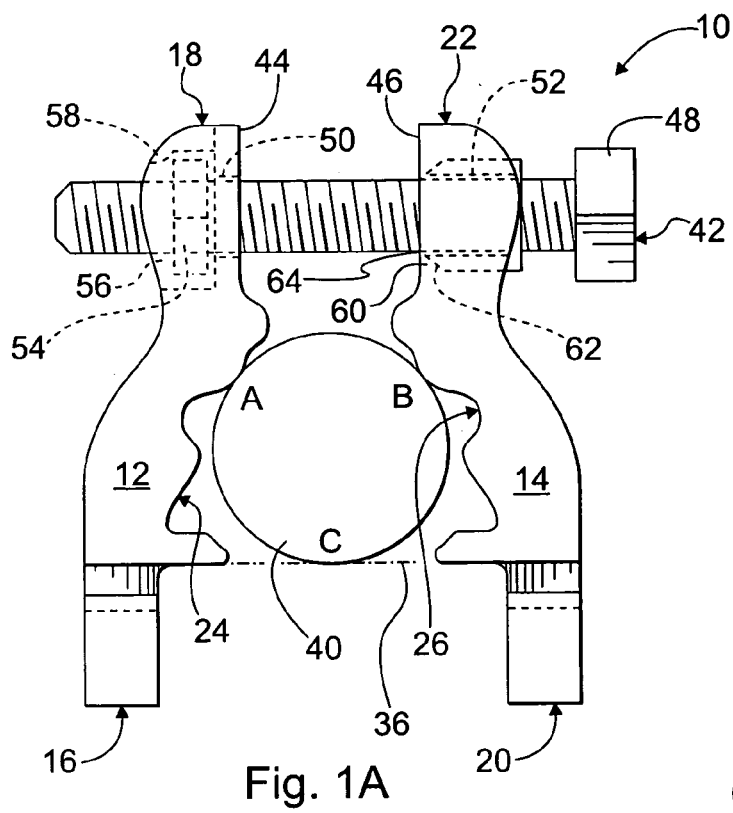
FIG. 1a is a plan view of an adjustable clamp assembly securing a cylindrical member of a certain diameter to a U-shaped support channel in accordance with one embodiment of the present invention.
Figure 1B:
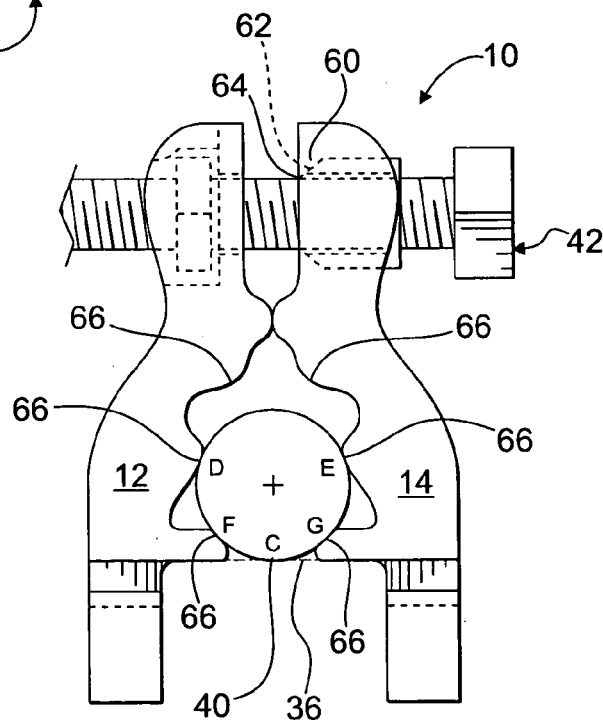
FIG. 1b is a plan view of the adjustable clamp assembly shown in FIG. 1a securing a cylindrical member of an alternate diameter in accordance with another embodiment of the present invention.
Figure 2:
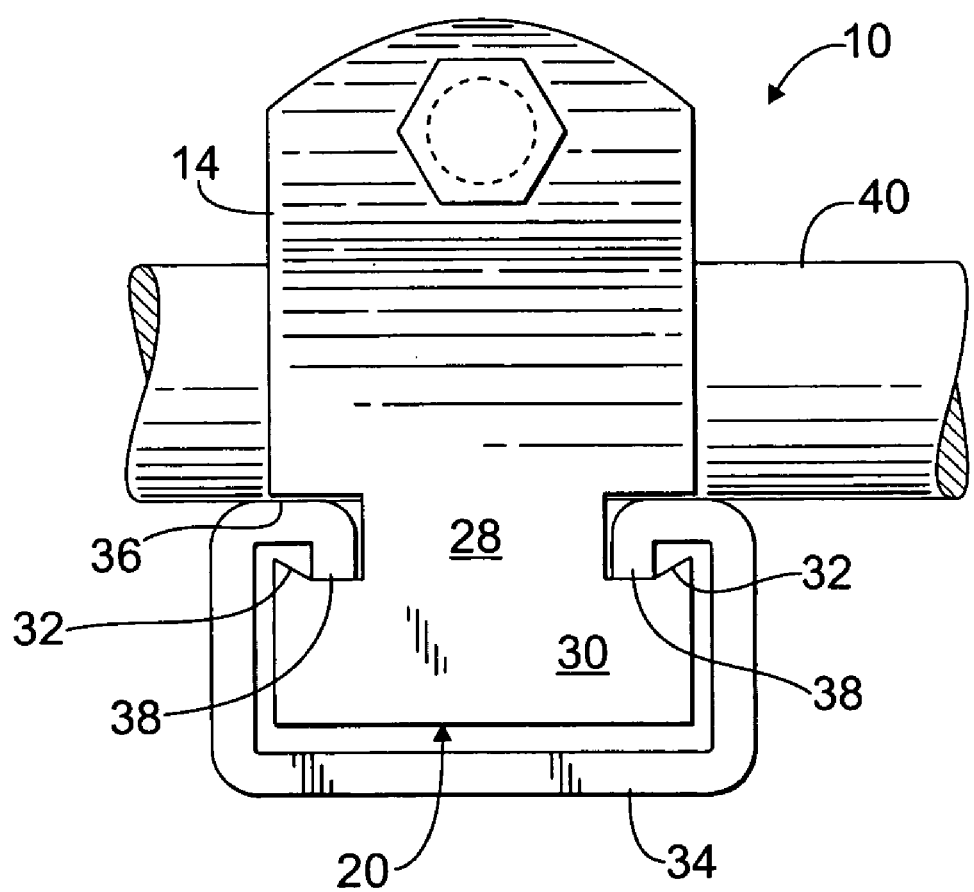
FIG. 2 is a side view of the adjustable clamp assembly shown in FIG. 1a looking down the support channel axis.

Referring to FIGS. 1a, 1b, and 2, an adjustable clamp assembly in accordance with an embodiment of the present invention is illustrated. The clamp assembly 10 is generally comprised of a unitary first clamp half 12 and a unitary second clamp half 14. The first and second clamp halves 12 and 14 can be substantially similarly shaped and generally include the same or similar features. For example, the first clamp half 12 is comprised of a first end 16 and a second end 18, while the second clamp half 14 is comprised of a corresponding first end 20 and a corresponding second end 22. Moreover, each clamp half further comprises inner surfaces 24 and 26, which share the same general profile.

The first ends 16 and 20 of each clamp half include a narrowed neck region 28 and a shoulder region 30 having a pair of shoulders 32. The first and second clamp halves 12 and 14 can be attached to a U-shaped support channel 34 by the first ends 16 and 20. The channel 34, best shown in FIG. 2, can be any slotted channel structure known in the art, such as Unistrut® metal framing, or the like. Channel 34 comprises a top 36 having inturned edges 38 forming a slot. Each first end can be aligned lengthwise with the slot and inserted into channel 34. An approximate 90° turn of each clamp half hooks the shoulders 32 against the interned edges 38, thereby preventing the first ends from being withdrawn from the channel 34. However, each clamp half remains freely movable along the channel axis such that a user can slide each individual clamp half to a desired location upon the channel 34.

In use, each clamp half can be slidably attached to the channel such that the inner surface 24 of the first clamp half 12 opposes the inner surface 26 of the second clamp half 14, i.e., inner surfaces 24 and 26 face inward toward each other. The first and second clamp halves 12 and 14 are positioned such that a cylindrical member 40 can be interposed between each clamp half. The cylindrical member 40 can be any elongate cylindrical structure, such as a pipe, a tube, conduit, or the like, which requires securement to the channel. The clamp halves can be pushed together along the channel axis until the inner surfaces 24 and 26 contact either side of the cylindrical member 40.

Prior to clamping the cylindrical member 40 to the channel 34, a fastener 42 is affixed to each clamp half. The second ends 18 and 20 of each clamp half comprise attachment regions 44 and 46 for receiving the fastener 42, thereby coupling the clamp halves together. Preferably, the fastener 42 is a nut and bolt assembly. However, it is fully contemplated that the fastener 42 can be any device available in the art for joining two parts together, such as, a screw, a rivet, a clamp, or the like. Once the fastener 42 is in place, it can be adjusted to gradually urge the clamp halves together, thereby applying the necessary clamping force against the cylindrical member 40 for securing it to the channel 34. Further, as the clamp assembly is tightened together, each clamp half is no longer freely movable along the channel axis. Rather, the tightening of the clamp assembly 10 about the cylindrical member 40 also fixedly attaches the clamp assembly 10 to the channel 34.

In a certain embodiment, the fastener 42 is a nut and bolt assembly, whereby a bolt 48 can be inserted through apertures 50 and 52 formed in each attachment region. For example, the bolt 48 can be inserted first through the second clamp half 14, then through the first clamp half 12. A nut 54 can be threaded onto the remainder of the bolt 48 protruding through the aperture 50. As the nut and bolt assembly is tightened, the clamp halves are urged together securing the cylindrical member 40 to the channel 34.

The first clamp half aperture 50 can include a boss 56, as shown in FIGS. 1a and 1b, for housing the nut 54 within the second end 18. Moreover, the boss 56 can be equipped with a detent 58 to secure the nut 54 within the boss 56 via a snap fit. This snap fit retention feature holds the nut 54 in place not only during and after clamping, but before as well to limit the number of loose parts which can be lost during transit. Similarly, the second clamp half aperture 52 can include a finger 60, which prevents the bolt 48 from being easily and accidentally ejected from the aperture 52 prior to clamping. The finger 60 may comprise a ramp 62 which permits the bolt threads to pass through rather easily upon insertion of the bolt through the aperture 52. The finger 60 may also comprise a stop 64 which snags the bolt threads upon removal of the bolt 48. The finger 60 merely inhibits removal of the bolt 48 such that purposeful force is required to withdraw the bolt 48 from the second clamp half 14. Accordingly, the finger 60 can also limit the number of loose parts of the clamp assembly 10 which can be lost during transit. Furthermore, both the nut detent 58 and the finger 60 can simplify the clamping process because extra hands/digits are no longer necessary to grasp the nut 54 and bolt 48 while positioning the clamp halves in place.

Referring specifically now to FIGS. 1a and 1b, the inner surfaces 24 and 26 of each clamp half comprise at least one grip bump 66. Preferably, the inner surfaces 24 and 26 of each clamp half comprise a plurality of grip bumps. The profile of the inner surfaces containing the at least one grip bump 66 can be specifically designed to secure a plurality of cylindrical member sizes in a single sized clamp assembly. For example, a single pipe clamp assembly can effectively clamp not only nominally sized cylindrical members, but also much larger and much smaller sized cylindrical members as well.

FIG. 1a illustrates a cylindrical member having a certain outside diameter, while FIG. 1b illustrates a cylindrical member having a relatively smaller outside diameter. The clamp halves 12 and 14 are urged together until the at least one grip bump 66 on each inner surface 24 and 26 makes contact with the cylindrical member 40. Depending on the size of the cylindrical member 40 being clamped, the point(s) of contact with the at least one grip bump 66 will differ. For the cylindrical member shown in FIG. 1a, contact may be made with the first clamp half 12 in the location generally indicated by "A," while contact may be made with the second clamp half 14 in the location generally indicated by "B". A third point of contact can be provided by the channel top 36 (shown in phantom) and is generally indicated by the letter "C". Accordingly, when the clamp assembly is tightened, forces are applied radially to the cylindrical member 40 at each contact point securing it in place. Alternately, contact can be made with the cylindrical member shown in FIG. 1b at the locations generally indicated by "C", "D", "E", "F", and "G". It is important to note that the description related to the embodiments in FIGS. 1a and 1b are merely exemplary and in no way act to limit the scope of the present invention. Rather, FIGS. 1a and 1b demonstrate the adjustment capability of the at least one grip bump 66 on each clamp half 12 and 14 for securing various sized cylindrical members to a support channel.

Preferably, the clamp assembly 10 provides for contact with the cylindrical member 40 in at least three locations, wherein two of the locations are divided between the at least one grip bump 66 of each clamp half. A third location can be the channel top 36. However, contact with the channel top 36 is not necessarily required. Instead, a third location of the at least three contact locations can be on a second, or possibly third, grip bump of the first clamp half 12. In this instance, a fourth location of the at least three contact locations is typically provided by a corresponding second or third grip bump on the second clamp half 14.

Since the clamp assembly 10 fits multiple sizes of cylindrical members, fewer clamp sizes are necessary to manufacture, warehouse, distribute, and keep on hand at a job site. Consequently, manufacturing is simplified, inventory stock-keeping units (SKU's) are reduced lowering overall inventory costs, and job costing is made easier and more accurate. Moreover, a user may always have the right clamp on when needed.

Preferably, first and second clamp halves 12 and 14 are molded entirely from a high strength plastic material such as glass-filled nylon, or nylon reinforced TPE, or the like. The plastic material provides similar strength to that of metal clamps, while remaining flexible enough to deform slightly to the cylindrical member 40 when clamping forces are applied, thereby eliminating the need for a cushion insert. The pull-out and slip loads of the clamp assembly 10 made from a nylon reinforced material rival that of steel. The slightly deformable plastic material can dampen vibrations minimizing wear and tear and limiting noise. Moreover, the plastic material can be UV resistant to prevent fading and degrading, thereby enabling the clamp assembly 10 for outdoor use. Further, the plastic material can be temperature resistant for use over a broad temperature range, e.g., 380° C. to −40° C. As such, the clamp assembly 10 can be utilized in a wide variety of applications, while maintaining the thermal barrier.

Another feature of the high strength plastic material can be that it is non-conducting. Accordingly, the clamp assembly 10 is suitable for use with copper tubing without fear of galvanic reaction. Further, the plastic material of the clamp assembly 10 can be corrosion resistant to prevent rust from forming making it a suitable replacement for stainless steel clamps, aluminum clamps, PVC clamps, and hot dipped galvanized clamps.

With reference now to FIGS. 3a, 3b, 4a, 4b, and 5, the clamp assembly in accordance with another embodiment of the present invention is illustrated. Whereas similar elements retain the same reference numerals, new elements are assigned new reference numerals. The clamp assembly 70 according to this embodiment is generally comprises of a unitary first clamp half 12 and a unitary second clamp half 14. The first clamp half 12 is comprised of a first end 16 and a second end 18, while the second clamp half 14 is comprised of a corresponding first end 20 and a corresponding second end 22.

Moreover, the clamp assembly 70 further comprises opposing inner surfaces 24 and 26, one on each clamp half, which share the same general profile. Preferably, inner surfaces 24 and 26 comprise primary contact faces 72 and 74 and secondary contact faces 76 and 78. Both the primary and secondary contact faces can be generally planar. Alternatively, the primary contact faces 72 and 74 can be generally arcuate, while the secondary contact faces 76 and 78 can be generally planar. Alternately, the primary contact faces 72 and 74 can be generally planar, while the secondary contact faces 76 and 78 can be generally arcuate. Irrespective of their shape, the primary and secondary contact faces 72, 74, 76, and 78 are generally defined by corresponding primary and secondary reference planes 80, 82, 84, and 86, respectively. Where the primary and secondary contact faces are generally planar, the contact faces can each lie in their corresponding reference plane. Where the primary and secondary contact faces are generally arcuate, chords intersecting endpoints of particular contact faces can also lie in their corresponding reference planes. The primary and secondary reference planes 80 and 84 of the first clamp half 12 form an inwardly facing interior angle 88 opposing a corresponding inwardly facing interior angle 90 subtended by the primary and secondary reference planes 82 and 86 of the second clamp half 14.

Figure 3A:
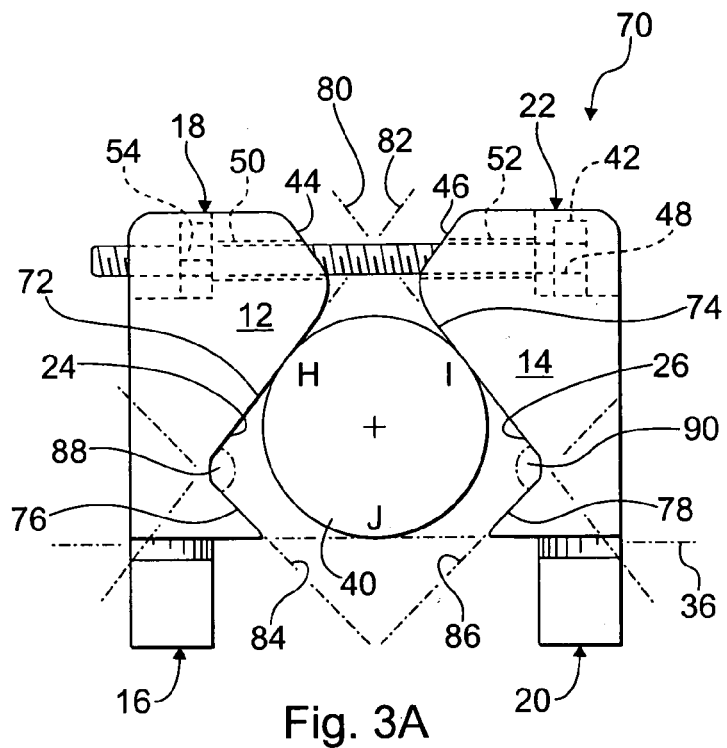
FIG. 3a is a plan view of an adjustable clamp assembly securing a cylindrical member of a certain diameter to a U-shaped support channel in accordance with another embodiment of the present invention.
Figure 3B:
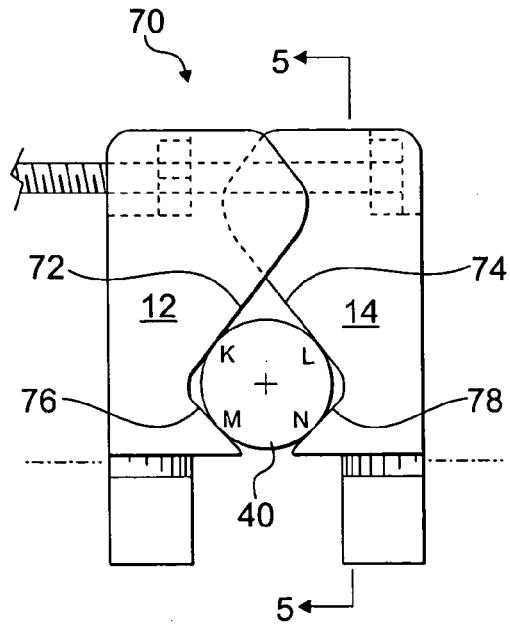
FIG. 3b is a plan view of the adjustable clamp assembly shown in FIG. 3a securing a cylindrical member of an alternate diameter in accordance with another embodiment of the present invention.

The first ends 16 and 20 of each clamp half can be slidably attached to a U-shaped support channel 34 as previously described. Again, the first and second clamp halves 12 and 14 can be positioned such that a cylindrical member 40 is interposed between each clamp half. The clamp halves can be pushed together along the channel axis until the inner surfaces 24 and 26 contact either side of the cylindrical member 40. The inner surfaces 24 and 26 can be generally shaped such that the primary contact faces 72 and 74, at the very least, engage the cylindrical member 40 upon clamping. For example, a relatively larger sized cylindrical member 40 can be secured to the channel, as shown in FIG. 3a, whereby clamping forces are applied radially and generally located at "H", "I", and "J". The force applied at "J" being the result of contact with the channel top 36 (shown in phantom). A relatively smaller sized cylindrical member 40 can be secured to a channel 34 without necessarily contacting the channel top 36, as shown in FIG. 3b. Instead, the cylindrical member is supported by clamping forces applied radially and generally located at "K", "L", "M", and "N". As such, smaller cylindrical members can be effectively spaced apart from the channel top 36. Of course, the description related to the embodiments in FIGS. 3a and 3b are merely exemplary and in no way act to limit the scope of the present invention. Rather, FIGS. 3a and 3b serve to demonstrate the adjustment capability of the clamp assembly for securing various sized cylindrical members to a support channel.

Figure 4A:
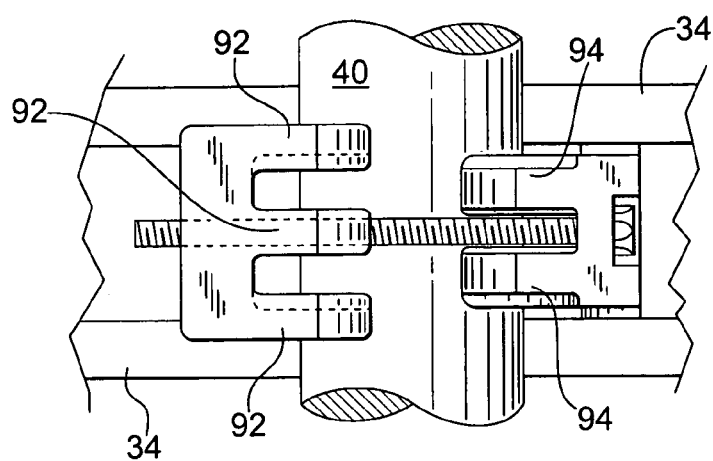
Figure 4B:
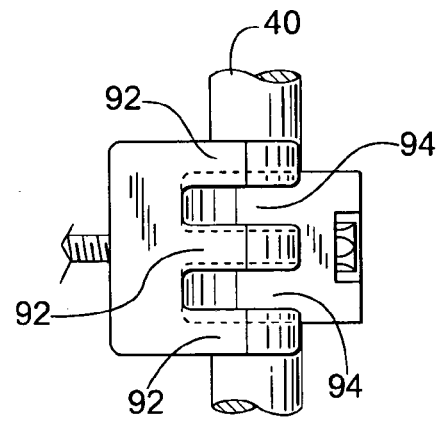
FIG. 4b is a top view of the adjustable clamp assembly shown in FIG. 3b.

To increase the adjustment capability of the clamp assembly 70, first and second clamp halves 12 and 14 can be interlockingly engageable. For example, the first clamp half 12 can be provided with three ribs 92, as shown in FIGS. 4a and 4b. Correspondingly, the second clamp half can comprise two ribs 94 shaped and aligned to correspond with the gaps between the ribs 92 in the first clamp half 12. Accordingly, the clamp halves can be urged toward one another such that the ribs 92 of the first clamp half 12 interleave with the ribs 94 of the second clamp half 14, as illustrated in FIG. 4b.

Figure 5:
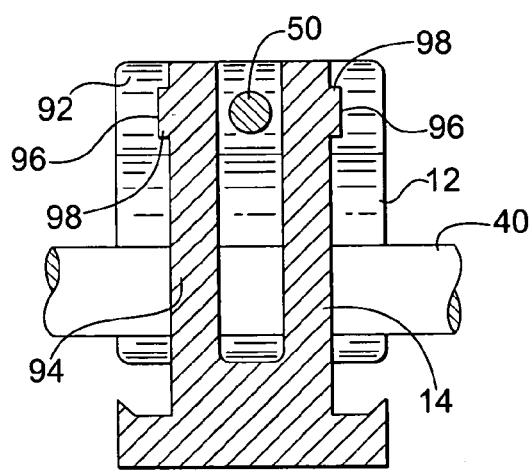
FIG. 5 is a side, cross-sectional view of the adjustable clamp assembly shown in FIG. 3b taken along the section line 5—5.

Moreover, the ribs 92 of the first clamp half 12 can include alignment grooves 96 along the rib interior, as is best shown in FIG. 5. The ribs 94 of the second clamp half 14 can include alignment tabs 98 matingly engageable with the alignment grooves 96 to facilitate alignment between the interleaved ribs. The alignment tab/groove engagement can increase the strength of the interlocking engagement as well as the strength of clamp assembly 70 overall. It is fully contemplated that the second clamp half ribs 94 can contain the alignment grooves while the first clamp half ribs 92 can contain the alignment tabs without departing from the scope of the present invention.

Figure 6:
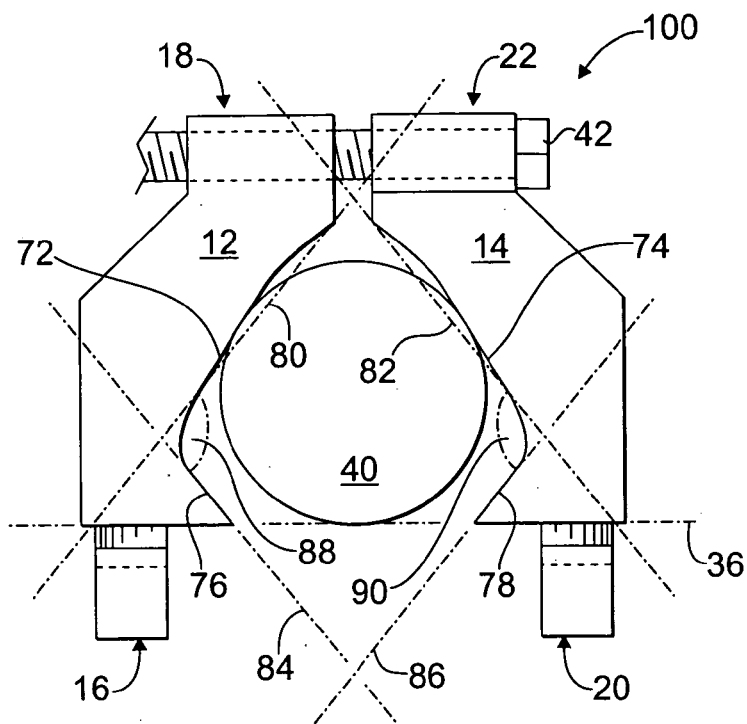
FIG. 6 is a plan view of an adjustable clamp assembly securing a cylindrical member of a certain diameter to a U-shaped support channel in accordance with yet another embodiment of the present invention.
Figure 7:
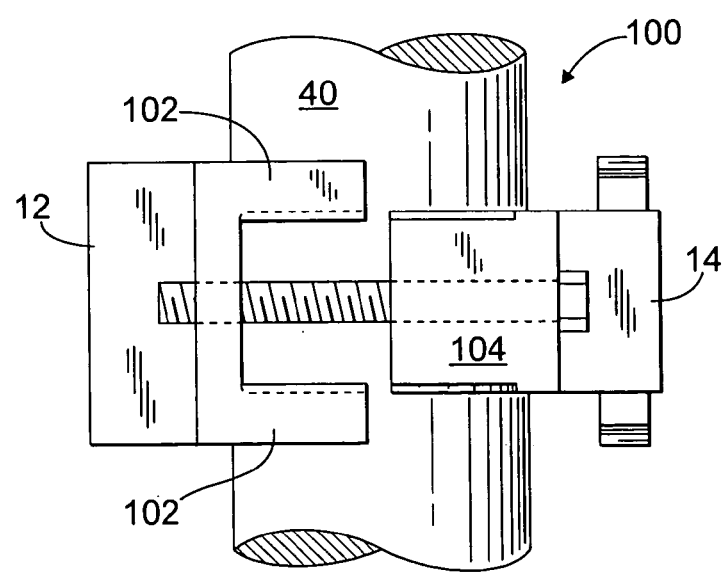
FIG. 7 is a top view of the adjustable clamp assembly shown in FIG. 6.

With respect to FIGS. 6 and 7, another embodiment of the present invention is illustrated. The clamp assembly 100 according to this embodiment also comprises two interlockingly engageable clamp halves 12 and 14. In this embodiment, a unitary first clamp half 12 can comprise of only two ribs 102, while a unitary second clamp half 14 can comprise of a single rib 104. Of course, any number combination of ribs between the first clamp half 12 and second clamp half 14 is well within the limits of the present invention.

Referring now generally to FIGS. 3a, 3b, 4a, 4b, 5, 6, and 7, the interlocking aspect of the present invention is suitable for clamping relatively small sized cylindrical members in clamp assemblies capable of supporting a relatively large sized cylindrical member. As such, the adjustment capability of the clamp assembly is not limited by the outer boundaries of each clamp half.

Again, a fastener 42 is affixed to each clamp half prior to clamping the cylindrical member 40 to the channel 34. The second ends 18 and 22 of each clamp half comprise attachment regions 44 and 46 for receiving the fastener 42, thereby coupling the clamp halves together. Preferably, the fastener 42 is a nut and bolt assembly. However, it is fully contemplated that the fastener 42 can be any device available in the art for joining two parts together, such as, a screw, a rivet, a clamp, or the like. Once the fastener 42 is in place, it can be adjusted to gradually urge the clamp halves together, thereby applying the necessary clamping force against the cylindrical member 40 for securing it to the channel 34. Further, as the clamp assembly is tightened together, each clamp half is no longer freely movable along the channel axis. Rather, the tightening of the clamp about the cylindrical member 40 also fixedly attaches the clamp assembly to the channel.

In a certain embodiment, the fastener 42 is a nut and bolt assembly, whereby a bolt 48 can be inserted through apertures 50 and 52 formed in each attachment region. For example, the bolt 48 can be inserted first through the second clamp half 14, then through the first clamp half 12. A nut 54 can be threaded onto the remainder of the bolt 48 protruding through the aperture 50. As the nut and bolt assembly is tightened, the clamp halves are urged together securing the cylindrical member 40 to the channel 34.

Furthermore, the clamp halves of the interlocking clamp assembly can be molded entirely from a high strength plastic material similar to the clamp assembly previously described in detail and show in FIGS. 1a and 1b. For example, the plastic can be glass-filled nylon, or nylon reinforced TPE, or the like. The plastic material provides similar strength to that of metal clamps, while remaining flexible enough to deform slightly to the cylindrical member 40 when clamping forces are applied, thereby eliminating the need for a cushion insert. The pull-out and slip loads of a clamp assembly made from a nylon reinforced material rival that of steel. The slightly deformable plastic material can dampen vibrations minimizing wear and tear and limiting noise. Moreover, the plastic material can be UV resistant to prevent fading and degrading and enabling the clamp assembly for outdoor use. Further, the plastic material can be temperature resistant for use over a broad temperature range, e.g., 380° C. to −40° C. As such, the clamp assembly can be utilized in a wide variety of applications, while maintaining the thermal barrier.

Another feature of the high strength plastic material can be that it is non-conducting. Accordingly, the clamp assembly is suitable for use with copper tubing without fear of galvanic reaction. Further, the plastic material of the clamp assembly can be corrosion resistant to prevent rust from forming making it a suitable replacement for stainless steel clamps, aluminum clamps, PVC clamps, and hot dipped galvanized clamps.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An adjustable clamp assembly for securing cylindrical members having variously sized outer diameters and an axial length to an elongate U-shaped support channel, the clamp assembly comprising:
    a unitary first clamp half formed from plastic having a first end slidably engageable to the support channel, a second end spaced apart from the channel, and an adaptable inner surface for mating engagement with cylindrical members having variously sized outer diameters, the first end including a shoulder region and a narrowed neck region disposed between the adaptable inner surface and the shoulder region;
    a unitary second clamp half formed from plastic having a corresponding first end slidably engaged to the support channel, a corresponding second end, and an adaptable inner surface for mating engagement with cylindrical members having variously sized outer diameters opposing the first clamp half inner surface, the corresponding first end including a corresponding shoulder region and a corresponding narrowed neck region disposed between the adaptable inner surface and the corresponding shoulder region;
    an attachment region formed at the second end of each of the first and second clamp halves for coupling the first and second clamp halves together; and
    a fastener cooperating with the first and second clamp half attachment regions to effectuate fastening engagement between the first and second clamp halves;
    wherein the adaptable inner surface of each clamp half includes a plurality of grip bumps extending axially along the adaptable inner surface parallel to the axial length of the cylindrical members and projecting radially inward to provide size adjustment capability for cylindrical members having variously sized outer diameters, each set of corresponding grip bumps or combination of grip bumps of the first and second clamp halves defining contact points corresponding to and engageable with a different sized outer diameter of said cylindrical members diameters.

2. The adjustable clamp assembly of claim 1, wherein the first clamp half and the second clamp half are adapted to cooperate with the support channel for securing cylindrical members having variously sized outer diameters thereto such that at least one of the plurality of grip bumps of the first clamp half and at least one of the plurality of grip bumps of the second clamp half makes direct contact with the cylindrical members having variously sized outer diameters.

3. An adjustable clamp assembly for securing cylindrical members having variously sized outer diameters and an axial length to an elongate U-shaped support channel, the clamp assembly comprising:
    a first clamp half having a first end slidably engageable with the support channel along a channel axis, a second end spaced apart from the channel, and an adaptable inner surface having a plurality of transverse, axially extending grip bumps extending parallel to the axial length of the cylindrical members and projecting radially inward for mating engagement with cylindrical members having variously sized outer diameters; and
    a second clamp half having a corresponding first end slidably engageable with the support channel along the channel axis, a corresponding second end, and an adaptable inner surface opposing the first clamp half inner surface having a plurality of transverse, axially extending grip bumps extending parallel to the axial length of the cylindrical members and projecting radially inward for mating engagement with cylindrical members having variously sized outer diameters, each set of corresponding grip bumps or combination of grip bumps of the first and second clamp halves defining contact points corresponding to and engageable with a different sized outer diameter of said cylindrical members each clamp half having an attachment region formed at the second end for coupling the first and second clamp halves together.

4. The adjustable clamp assembly of claim 3, having at least two contact points for securing cylindrical members having variously sized standard outer diameters to the support channel, the at least two contact points including the at least one of the plurality of grip bumps of the first clamp half and the at least one of the plurality of grip bumps of the second clamp half.

5. The adjustable clamp assembly of claim 3, wherein the first end of each clamp half includes a narrowed neck region and a shoulder region for cooperating with the support channel to effectuate sliding engagement.

6. The adjustable clamp assembly of claim 3, wherein the attachment region of each clamp half comprises an aperture for at least partially inserting a fastener therethrough to couple the first clamp half to the second clamp half.

7. The adjustable clamp assembly of claim 6, wherein the fastener comprises a nut and bolt assembly.

8. The adjustable clamp assembly of claim 6, wherein the first clamp half aperture includes a boss for housing a nut, the boss having a detent formed therein for snap fit retention of the nut, the second clamp half aperture having a finger for retaining a bolt.

* * * * *